United States Patent
Mattejat et al.

(10) Patent No.: US 8,338,048 B2
(45) Date of Patent: Dec. 25, 2012

(54) FUEL CELL

(75) Inventors: Arno Mattejat, Erlangen (DE); Igor Mehltretter, Buckenhof (DE)

(73) Assignee: Siemens Aktiengesellschaft, München (DE)

( * ) Notice: Subject to any disclaimer, the term of this patent is extended or adjusted under 35 U.S.C. 154(b) by 396 days.

(21) Appl. No.: 12/530,008

(22) PCT Filed: Mar. 4, 2008

(86) PCT No.: PCT/EP2008/052606
§ 371 (c)(1),
(2), (4) Date: Sep. 4, 2009

(87) PCT Pub. No.: WO2008/107434
PCT Pub. Date: Sep. 12, 2008

(65) Prior Publication Data
US 2010/0104922 A1    Apr. 29, 2010

(30) Foreign Application Priority Data
Mar. 8, 2007    (EP) .................................... 07004799

(51) Int. Cl.
*H01M 2/38* (2006.01)
*H01M 8/04* (2006.01)

(52) U.S. Cl. ........ 429/456; 429/457; 429/512; 429/513; 429/514

(58) Field of Classification Search ................... 429/453, 429/454, 455, 456, 457, 512, 513, 514, 518
See application file for complete search history.

(56) References Cited

U.S. PATENT DOCUMENTS

| 6,706,436 | B2 * | 3/2004 | Molter | 429/434 |
| 6,780,536 | B2 * | 8/2004 | Debe et al. | 429/514 |
| 6,893,759 | B2 * | 5/2005 | Ooma et al. | 429/437 |
| 2004/0151970 | A1 | 8/2004 | Ferguson | |
| 2007/0105000 | A1 * | 5/2007 | Chapman et al. | 429/38 |
| 2008/0193825 | A1 * | 8/2008 | Nguyen et al. | 429/34 |

FOREIGN PATENT DOCUMENTS

| DE | 10300068 A1 | 8/2003 |
| JP | 60243974 A | 12/1985 |
| JP | 01105474 A | 4/1989 |
| WO | WO 01/41239 A1 | 6/2001 |
| WO | WO 03/081703 A2 | 10/2003 |

* cited by examiner

Primary Examiner — Carlos Barcena

(57) ABSTRACT

A fuel cell with a gas chamber, arranged between two plate elements, is provided. One of the plate elements includes bosses for supporting the plate element on the other plate element in a regular grid structure. Between the bosses runs a network of gas channels passing through the gas chamber, the bosses being at most three times longer than wide. The bosses form between themselves first gas channels in a first region of the gas chamber and larger-volume second gas channels in a second region of the gas chamber.

18 Claims, 3 Drawing Sheets

FUEL CELL

CROSS REFERENCE TO RELATED APPLICATIONS

This application is the US National Stage of International Application No. PCT/EP2008/052606 filed Mar. 4, 2008, and claims the benefit thereof. The International Application claims the benefits of European Patent Application No. 07004799.8 EP filed Mar. 8, 2007; both of the applications are incorporated by reference herein in their entirety.

FIELD OF INVENTION

The invention relates to a fuel cell with a gas chamber arranged between two plate elements, one of the plate elements having bosses to support the plate element on the other plate element in a regular grid structure, between which a network of gas channels passing through the gas chamber runs, the bosses being at most three times as long as they are wide.

BACKGROUND OF INVENTION

In a fuel cell hydrogen ($H_2$) and oxygen ($O_2$) react with an electrolyte and emit heat to produce electrical energy and product water, which—together with condensed out humidifying water—must be removed from the fuel cell. This is done by blowing the water out of the fuel cell using excess process gas, for which reason it has to be supplied with more process gas than it requires for the reaction.

The active membrane and the electrodes of a PEM (Proton Exchange Membrane or Polymer Electrolyte Membrane) fuel cell enclosing it must be supplied evenly with process gases both on the anode side and on the cathode side, in order to achieve the most even cell activity possible over the entire active surface. Where the power densities are high, locally uneven activities result in local temperature increases and possible damage to the membrane and the electrodes.

The intake and egress of the two process gases into a fuel cell is realized by means of discrete channels, the geometry and position of which cannot always be configured in an optimum manner in relation to the active surfaces due to basic structural conditions. Therefore in both gas chambers of the fuel cell there are regions through which the flow is good and in which water is effectively eliminated and other regions, so-called flow shadows, where the flow is simply weak and the water is not satisfactorily eliminated. In unfavorable instances deposited drops of water can block the cell function in such flow shadows.

In fuel cells, which are operated with process gases with inert components, such as reformer gas or air, inert gas blankets foam in the regions with a poor throughflow, reducing the performance of the active components locally there. The fuel cell is then operated with a gas which has a low concentration of useful gas.

To resolve this problem US 2004/0151970 A1 proposes providing a structure made up of a large number of adjacent meandering channels rather than one larger gas chamber. However this results in a high gas pressure gradient in the fuel cell.

A fuel cell is known from DE 103 00 068 A1, in which the gas chambers are provided with oblong gas conducting elements. These conduct the process gases from a gas inlet to a gas outlet of the gas chambers in such a manner that they flow in particular through regions which would otherwise have a poor throughflow.

It is known from WO 03/081703 A2 that gas chambers can have narrow branches to achieve an even flow through the fuel cell.

SUMMARY OF INVENTION

One object of the present invention is to specify a fuel cell, in which there is a particularly even local flow of process gas over the membrane electrolyte unit.

This object is achieved by a fuel cell of the type mentioned in the introduction, in which the bosses between them form first gas channels in a first region of the gas chamber comprising a number of bosses and larger-volume second gas channels in a second region of the gas chamber comprising a number of bosses. The resulting variation in the flow cross-sections of the gas channels means that the gas flows can be directed by different flow resistances of the gas channels.

The invention here is based on the consideration that directing a flow along continuous flow barriers produces eddies and turbulence at their ends or in particular at kinks, these resulting in turn in flow shadows. It is therefore more favorable to direct the flow by means of a plurality of separate bosses with individual flows around them, as these can configure a more even flow.

The local variation in the bosses allows the overall channel volume of the second region through which the process gas flows to be larger than the overall channel region of the first region through which there is a flow, thereby allowing a smaller flow resistance to be implemented. The second region therefore has a larger overall channel volume than the first region. In another embodiment the second region can have a number of channels, each passing a number of bosses and their channel volume being respectively greater than the channel volume of similar channels of the first region, which are in particular the largest-volume channels of the first region.

By configuring the flow resistance with the aid of the size of the channel volume or overall channel volume, it is possible to direct process gas in a preferred direction, in other words a main flow direction, in which the majority of the process gas flows. There is then no need for a full flow barrier, along which the process gas is conducted, so the process gas can advantageously always flow in both regions from any point to any point in the channel network—in other words for example in both coordinate directions of a two-dimensional flow pattern.

The regular grid structure of the bosses allows a flow to be achieved which is even over a large surface. The grid structure here is formed by a two-dimensional, regularly repeating arrangement of the bosses, so that there is a regular succession of bosses in both spatial directions—for example in Cartesian or polar coordinates. The ideal grid structure can be fowled here by the geometric center points of the bosses.

In one advantageous embodiment of the invention the bosses are embodied in a compact manner and are at most three times as long as they are wide, in particular only at most twice as long as they are wide. This allows an even flow through the regions around the bosses. The bosses are expediently fowled symmetrically about a boss center point, being for example circular, oval, hexagonal or square. The symmetry here is advantageously two-dimensional, so that the bosses are essentially as long as they are wide. The flow around the bosses can have few eddies, in particular can have no eddies, if the bosses are without edges perpendicular to the gas channels.

The gas flows can be directed advantageously into desired regions of the gas chamber, if the gas chamber has a gas inlet } and a gas outlet, with a flow resistance from the gas inlet to the gas outlet along second gas channels being smaller per section in the center than through first channels. The flow resistance is to be understood as the flow resistance of the process gas, in particular measured with the process gas at identical flow speed through the second and through the first gas channels.

The gas chamber and the active surface of the fuel cell over which the process gas is to flow therein are expediently rectangular, so that the fuel cell can be embodied in a compact manner.

If the first region is an inner region and the second region is an edge region of the gas chamber, the gas flow can be conducted into the edge region in a preferred manner, so that the formation of a flow shadow in an edge region is counteracted. The edge region is in particular a corner region, in which there would otherwise be a strong tendency to form a flow shadow.

As a flow shadow generally forms in an edge region of a gas chamber, an arrangement of the second region around the edge of the edge region is advantageous, with the first region being completely enclosed by the second region.

In another embodiment the arrangement of the regions is selected so that the first region forms a barrier over which the entire process gas flow through the gas chamber has to flow. The gas flow can thus be made to be distributed first in the second region before flowing over or through the barrier, thereby producing an even process gas distribution in the gas chamber. The barrier here can itself be divided into regions of different flow resistance like first and second regions.

A barrier or constriction can be formed simply if the first region extends in a perpendicular manner through the gas chamber from one edge region to an opposite edge region. The process gas can be distributed first in the second region with the further gas channels before and along the constriction. After distribution there is a flow over a large area through the constriction, so that a widely distributed flow fauns and there is therefore an even flow over the active surface.

There is advantageously a third region adjacent to the barrier in a downstream direction, in which third region the bosses form gas channels, the volume of which is between the volumes in the first two regions and a second region in particular downstream therefrom. The gradient of flow resistance thus faulted draws the gas flow in the direction of the larger-volume third and then second region, thereby counteracting an unwanted cross or diagonal flow.

A locally even flow over the active surface of the fuel cell can be further improved if the regions are arranged in relation to one another in such a manner that the flow resistances in the regions encourage a z-shaped flow through the gas chamber. It is possible to counteract an unwanted cross or diagonal flow to the extent that it is attenuated, eliminated or even actually characterized as Z-shaped.

The difference in volume and/or flow resistance between the gas channels in the first and second regions can be formed in one advantageous embodiment of the invention by a variation in the size of the bosses. It is possible to vary the width of the free passage area, in other words the width of a gas channel or the size of the overall flow cross section of all the gas channels in the region.

A further easily achievable option for varying the overall flow cross section or overall flow resistance between the regions consists of limning the difference between the gas channels in the first and second regions by varying the form of the bosses. This impacts on the form of the gas channels. It is possible to influence flow characteristics of the gas channels in a simple manner.

The difference between the gas channels in the first and second regions can also be fowled by varying the grid structure. It is thus possible to vary the number of adjacent gas channels per section perpendicular to the gas channels and thus the flow resistance of all the gas channels in this region in a simple manner. The grid structure can be achieved by varying the grid constant. This impacts on the distance between the gas channels and thus on the size of an overall flow cross section in the regions. It is rather more complex to vary the form of the grid structure, for example from a hexagonal to a square structure, by means of which it is possible to achieve a subtle variation in the direction of the gas channels.

It is possible to vary the fowl of the bosses by making the angles of slope of the gas channels different in the first and second regions. It is possible to achieve a very even flow speed in the gas channel with a steep angle of slope and a slow flow counteracting turbulence in direct proximity to the bosses by means of a flat angle of slope. The angle of slope here is in particular the maximum angle of slope of a gas channel at a boss.

BRIEF DESCRIPTION OF THE DRAWINGS

The invention is described in more detail below with reference to exemplary embodiments illustrated in the drawings, in which.

DETAILED DESCRIPTION OF INVENTION

Figure 1:
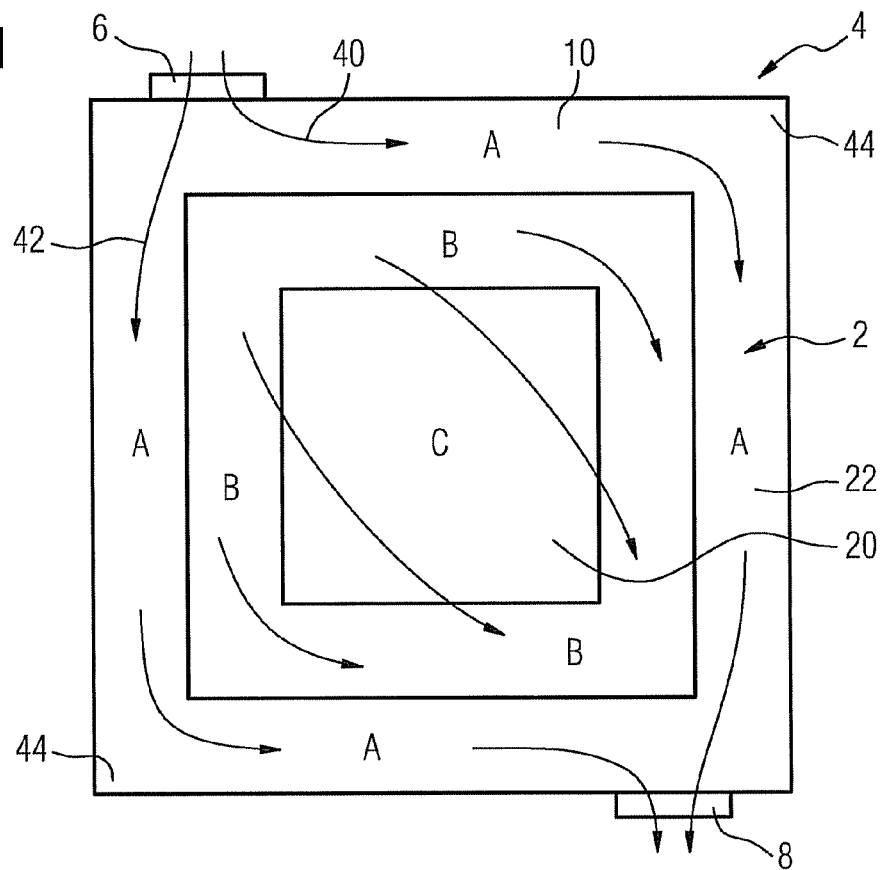
FIG. 1 shows a gas chamber of a fuel cell with three regions having gas channels of different flow resistances.

FIG. 1 shows a schematic plan view of a gas chamber 2 of a fuel cell 4. Connected to the gas chamber 2 are a gas inlet 6 for introducing process gas into the gas chamber 2 and a gas outlet 8 for discharging the process gas not used in the gas chamber 2 and water from the gas chamber 2. The gas chamber 2 is bounded on both its flat sides by two plate elements 10, 12, shown in a sectional diagram in FIG. 4. The plate element 10 is metallic and part of a bipolar plate separating two fuel cells 4. The plate element 12 is an electrode, for example an anode.

Figure 2:
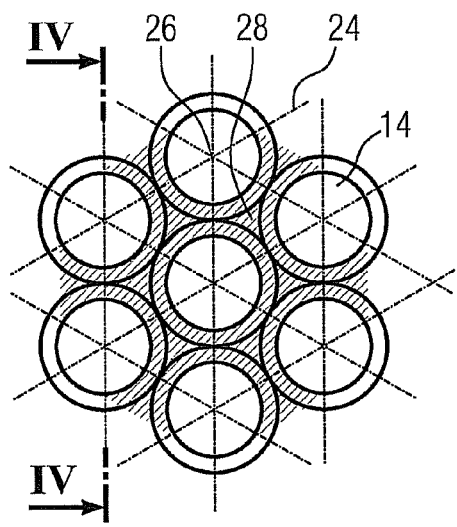
FIG. 2 shows a plan view of bosses forming gas channels.
Figure 3:
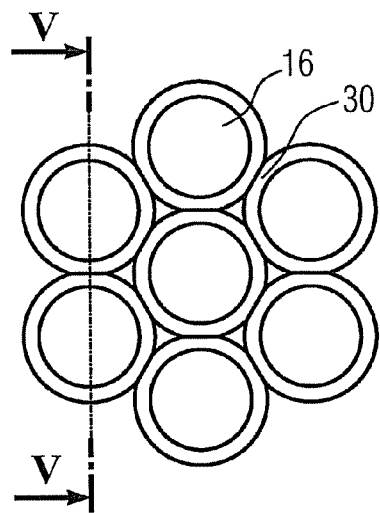
FIG. 3 shows a plan view of bosses forming narrower gas channels.
Figure 4:
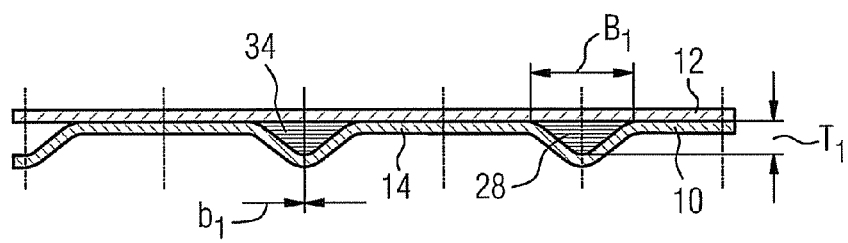
FIGS. 4-9 show sections through plate elements with differently formed bosses and different gas channels funned between them.
Figure 5:
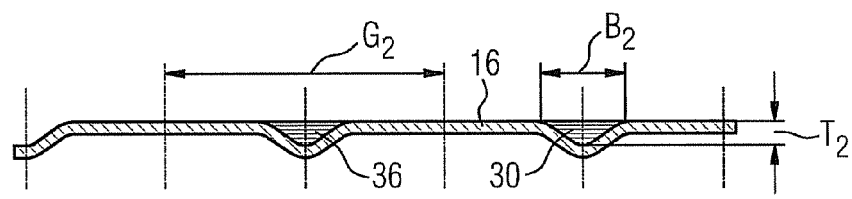
Figure 6:
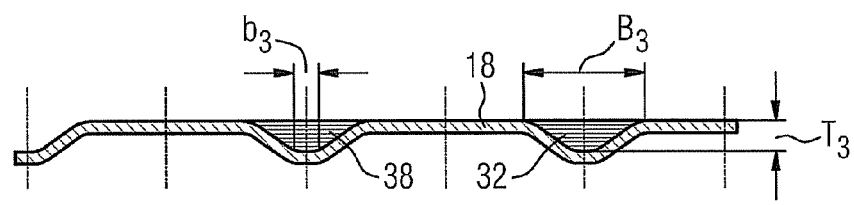

While the plate element 12 is essentially flat and without bosses, a plurality of bosses 14, 16, 18 are embossed into the plate element 10, as shown in a plan view in FIGS. 2 and 3 and in a sectional view in FIGS. 4-6. The two plate elements 10, 12 abut against one another on the bosses 14, 16, 18.

The plate element 10—and therefore the gas chamber 2—is divided into three regions A, B, C, in which the bosses 14, 16, 18 are respectively of different sizes. In the region C in an inner region 20 of the gas chamber 2 the plate element 10 is provided with bosses 16, in an edge region 22 with bosses 18 and between these with bosses 14. All the bosses 14, 16, 18 are arranged in a regular hexagonal grid structure 24, which is totally identical in all three regions A, B, C. Boss center points 26 of the bosses 14, 16, 18 are arranged here in such a manner that they form the grid structure 24, as shown in FIG. 2. The boss center points 26 here are the geometric center points of the circular bosses 14, 16, 18 fowled symmetrically around them.

Between them the bosses 14, 16, 18 form a network of gas channels 28, 30, 32 passing through the gas chamber 2, connecting the gas inlet 6 to the gas outlet 8. For clarification the network of gas channels 28 between the bosses 14 is shown hatched in FIG. 2. The different sizes of the bosses 14, 16, 18 mean that the gas channels 28, 30, 32 are fowled with different flow cross sections 34, 36, 38 at their narrowest points, as shown hatched in FIGS. 4-6 for clarification. Thus for example because the flow cross section 36 of the gas channels 30 in region C is narrower than the flow cross section 38 of the gas channels 32 in region A, the flow resistance of the gas chamber 2 in region C is higher per flow section than in region A per identical flow section.

The different flow resistances of the gas chamber 2 in the regions A, B, C mean that the process gas flowing in through the gas inlet 6 is directed in a preferred direction 40, 42 along the region A and therefore along the edge region 22, so that no flow shadows form in the two opposite corner regions 44 away from the gas inlet 6 and the gas outlet. The flow resistance is greatest in the region C, so that, despite the shortest section of a gas flow running in the region C from the gas inlet 6 to the gas outlet 8, only the same amount of process gas flows here per area as in the region A. As far as flow resistance is concerned, the region B is roughly in the center between the regions A, C. The flow resistance from the gas inlet 6 to the gas outlet 8 along the gas channels 32 is smaller per section in the center than through the gas channels 28, 30. The flow resistance from the gas inlet 6 to the gas outlet 8 along the gas channels 32 is overall essentially the same as on the shortest path from the gas inlet 6 to the gas outlet 8 along the gas channels 28, 30, 32.

As shown in FIGS. 4-6 the variation in the volume of the gas channels 28, 30, 32 is formed by a variation in the size of the circular bosses 14, 16, 18. In FIG. 4 the gas channels 28 are v-shaped with the maximum width $B_1$, depth $T_1$ and the channel base width $b_1$ of zero: The gas channels 30 are embodied in a similarly v-shaped manner and with the same angle of slope but with a smaller depth $T_2$ and width $B_2$. The gas channels 32 are fowled in the same way as the gas channels 28 but somewhat further apart at the channel base, so that the channel base has the width $b_3$. The width $b_3$ and thus the volume of the gas channel 32 at the narrowest point is the greatest of all the gas channels 28, 30, 32 and the depth $T_3$ is the same as the depth $T_1$.

The impact of the variations in channel volume on the flow resistance or pressure drop within a gas chamber is explained with reference to the table below. The pressure drop was measured on three gas chambers with the dimensions 70 mm×70 mm, each being provided with a plate element 10 with just one type of boss 14, 16, 18, in other words just one type of region A, B, C respectively.

|  | $G_2$-$B_i$ | 34, 36, 38 | % | Pressure drop $O_2$ | % | Pressure drop $H_2$ | % |
|---|---|---|---|---|---|---|---|
| Region A | 3.9 mm | 58 mm² | 135 | 0.5 mbar | 80 | 0.7 mbar | 78 |
| Region B | 4.2 mm | 43 mm² | 100 | 0.6 mbar | 100 | 0.9 mbar | 100 |
| Region C | 4.4 mm | 32 mm² | 75 | 0.8 mbar | 132 | 1.1 mbar | 122 |

While the pressure drop was 0.8 mbar on the oxygen side and 1.1 mbar on the hydrogen side in the gas chamber with just the largest bosses 16, it was only 0.5 mbar and 0.7 mbar in the gas chamber with just the smallest bosses 18. A significantly lower-resistance throughflow of the region A is thus achieved compared with the region C.

Figure 7:
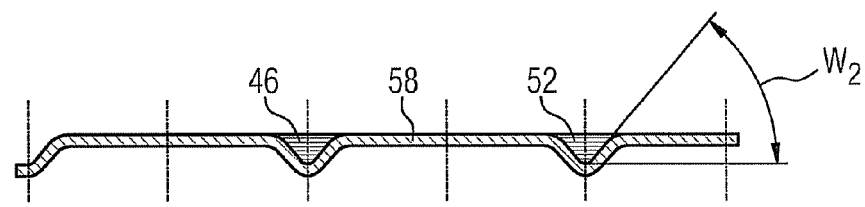
Figure 8:
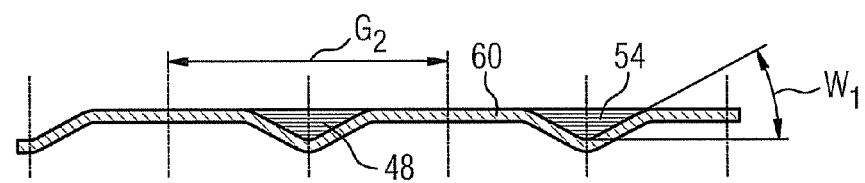
Figure 9:
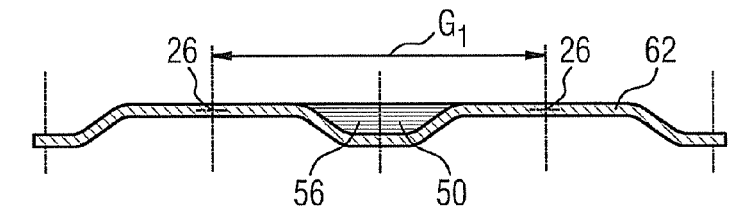

Other variation options for the narrowest flow cross sections 46, 48, 50 of gas channels 52, 54, 56 are shown in FIGS. 7-9. The gas channels 54 shown in FIG. 8 between bosses 60 are thus characterized by a flatter angle of slope $W_1$ with the same depth and are therefore larger-volume than the gas channels 52 between bosses 58 with the steeper angle of slope $W_2$. In this manner a channel network made up of the gas channels 54 has a smaller flow resistance per section of throughflow or per region area than a channel network made up of gas channels 52.

In FIG. 9 bosses 62 are arranged at a greater distance from one another, so that a grid constant $G_1$ for an identical hexagonal grid structure for example is greater than the grid constant $G_2$ in FIGS. 4-8.

In further variant options the forms of bosses and/or the grid structure can be changed, so that the channel network form and the width of the gas channels or the channel network form and channel density can be changed. In this manner and as described above both the flow resistance per section through a region A, B, C and also a flow behavior can be set specifically for desired characteristics of the fuel cell 4.

Figure 10:
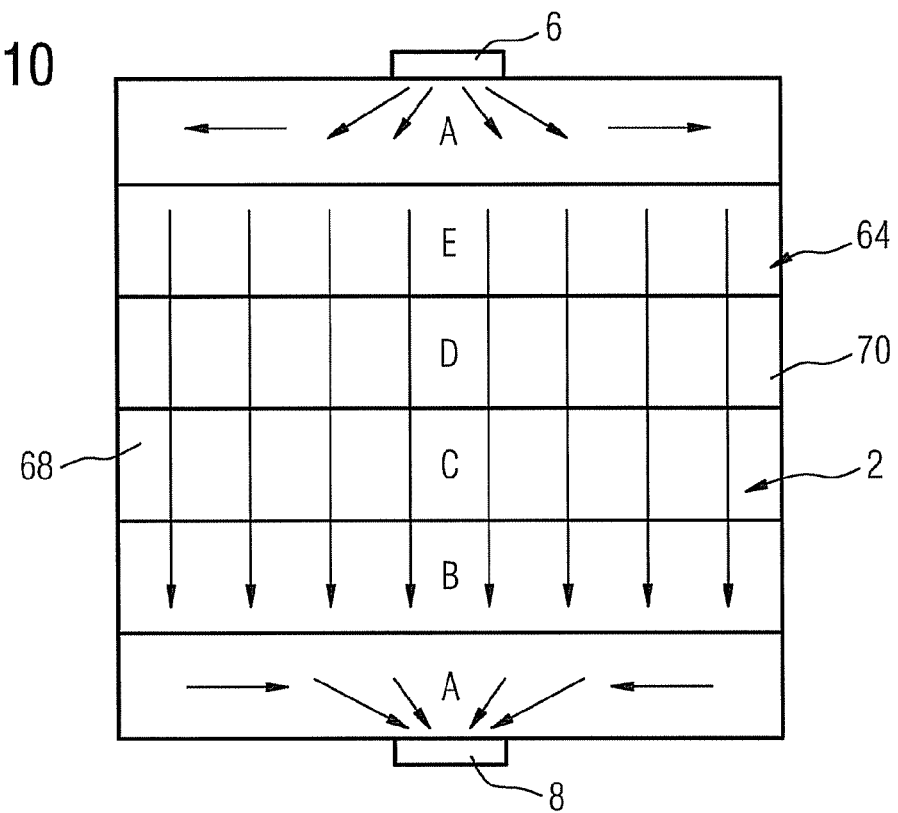
FIG. 10 shows a gas chamber with six regions with gas channels with five different flow resistances.
Figure 11:
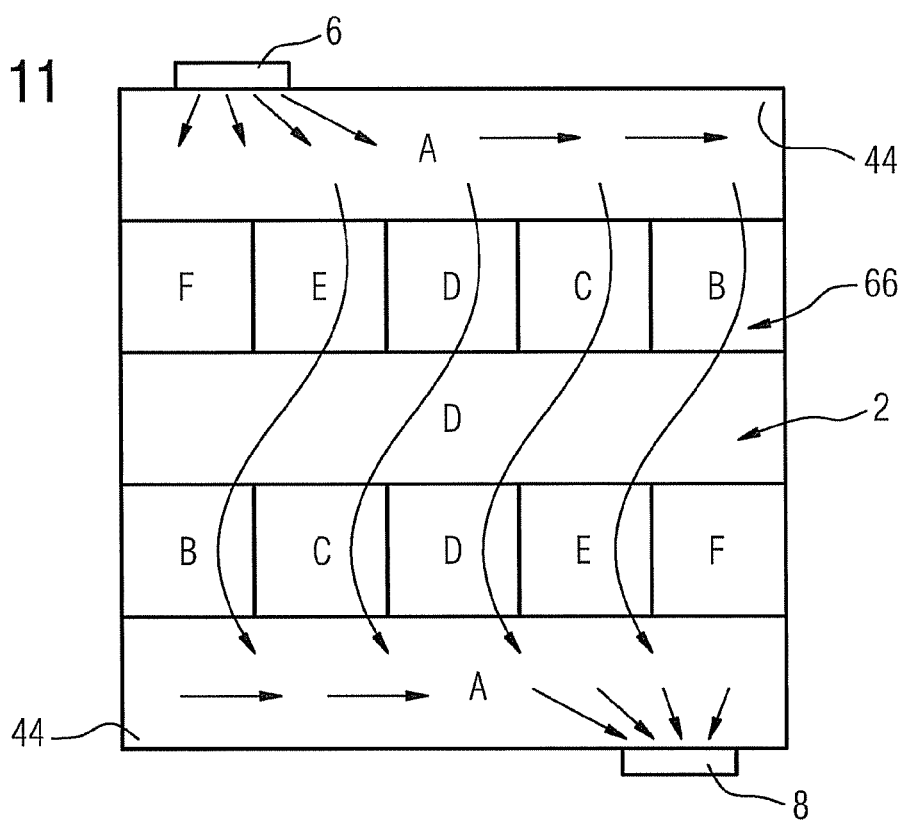
FIG. 11 shows a gas chamber with a plurality of regions with gas channels with six different flow resistances.

Two further examples of gas chambers 64, 66 are shown in FIGS. 10 and 11. The description which follows is limited essentially to the differences in relation to the exemplary embodiment in FIG. 1, to which reference is made for identical features and functions. Essentially identical components are in principle shown with the same reference characters.

The gas chamber 4 in FIG. 10 is divided into six strip-type regions A-E, each running in a perpendicular manner through the gas chamber 2 from one edge region 68 to the opposite edge region 70. The flow resistance of the regions A-E per section with throughflow is set so that the flow resistance of the region A is the smallest, that of the region B greater, that of the region C even greater, that of the region D greater still and that of the region E the greatest.

The input-side region A with its small flow resistance favors even distribution of the process gas over the entire width of the square gas chamber 2. The region E here represents a constriction or barrier through which a flow can only pass with a greater flow resistance and along which the majority of the process gas is initially propagated. After distribution the process gas as a whole flows through the region E and is directed by the gradient of the flow resistance from the region E to the output-side region A essentially straight through the regions E-B. In this process the process gas also flows satisfactorily along the edge regions 68, 70 to the gas outlet 8. In the output—side region A of small flow resistance the process gas can move with only little hindrance to the gas outlet 8 and in particular can discharge with it the product water resulting in the gas chamber 2 on the cathode side.

With the division of the regions shown in FIG. 10 it is not possible completely to prevent a certain diagonal flow component from the gas inlet 6 to the gas outlet 8 being retained in the gas flow through the regions E-B. A division of regions A-F as shown in FIG. 11 is suitable in order to reduce this, to prevent it or even to retain a slightly Z-shaped flow. The regions A are embodied as in the example in FIG. 10. Two strips, each of five regions B-F arranged opposite one another, however form a gradient of the flow resistance essentially perpendicular to the gas flow. This deflects the gas flow perpendicular to its flow direction in the direction of a Z-shaped flow so that the unwanted diagonal flow is reduced, avoided or a Z-shaped flow as shown in FIG. 11 is even achieved.

It is thus possible to avoid a flow shadow effectively in the corner regions 44. The product water is effectively removed through the output-side region A with small flow resistance, so that the blocking of cell regions and corrosion due to ionic enrichment in the water are avoided. The measures in the exemplary embodiments also allow an even concentration of inert gases to be achieved over the entire active surface of the gas chamber 2 and the formation of flow shadows, dead areas and eddies is avoided.

The invention claimed is:

1. A fuel cell, comprising:
   a gas chamber;
   a first plate element including bosses in a regular grid structure;
   a second plate element, the gas chamber being arranged between the first and second plate element, the bosses of the first plate element supporting the first plate element on the second plate element; and
   a network of gas channels running between the bosses, the gas channels passing through the gas chamber and the bosses being at most three times as long as they are wide, wherein the bosses form first gas channels in a first region of the gas chamber including a plurality of bosses and larger-volume second gas channels in a second region of the gas chamber including a plurality of bosses,
   and wherein the bosses are arranged in a regular hexagonal grid structure.

2. The fuel cell as claimed in claim 1, wherein the bosses are formed symmetrically about a boss center point.

3. The fuel cell as claimed in claim 2, wherein the gas chamber has a gas inlet and a gas outlet, and wherein a flow resistance from the gas inlet to the gas outlet along the second gas channels is smaller per section in an average than through the first gas channels.

4. The fuel cell as claimed in claim 1, wherein the gas chamber has a gas inlet and a gas outlet, and wherein a flow resistance from the gas inlet to the gas outlet along the second gas channels is smaller per section in an average than through the first gas channels.

5. The fuel cell as claimed in claim 1, wherein the first region is an inner region and the second region is an edge region of the gas chamber.

6. The fuel cell as claimed in claim 1, wherein the first plate element with the bosses has two edge regions opposite one another and the first region extends in a perpendicular manner through the gas chamber from one of the edge regions to the opposite edge region.

7. The fuel cell as claimed in claim 1, wherein the first and second regions are arranged in relation to one another such that flow resistances in the first and second regions encourage a z-shaped flow through the gas chamber, in that a first region is arranged between second regions and the first region forms a gradient of the flow resistance perpendicular to a flow direction of gas flowing through the gas channels from a second region to the first region and on to the next second region.

8. The fuel cell as claimed in claim 1, wherein a difference between the gas channels in the first and second regions is formed by a variation in the size of the bosses.

9. The fuel cell as claimed in claim 8, wherein a difference between the gas channels in the first and second regions is formed by a variation in the form of the bosses.

10. The fuel cell as claimed in claim 9, wherein a difference between the gas channels in the first and second regions is formed by a variation in the grid structured such that the number of adjacent gas channels varies per section perpendicular to the gas channels.

11. The fuel cell as claimed in claim 10, wherein angles of slope of the gas channels in the first and second regions are different.

12. The fuel cell as claimed in claim 1, wherein a difference between the gas channels in the first and second regions is formed by a variation in the form of the bosses.

13. The fuel cell as claimed in claim 1, wherein a difference between the gas channels in the first and second regions is formed by a variation in the grid structure such that the number of adjacent gas channels varies per section perpendicular to the gas channels.

14. The fuel cell as claimed in claim 1, wherein angles of slope of the gas channels in the first and second regions are different.

15. The fuel cell as claimed in claim 1, wherein the gas channels are v-shaped and each respective gas channel has a width, a height and a channel base width; and wherein the respective width and height of the first gas channels are smaller than the respective width and height of the second gas channels.

16. The fuel cell as claimed in claim 15, wherein the respective channel base width of the first gas channels is zero, and wherein the respective channel base width of the second gas channels is greater than zero.

17. The fuel cell as claimed in claim 1, wherein the bosses are circular and form a first regular hexagonal grid structure in the first region, said first regular hexagonal grid structure comprising a first boss center point at a geometric center point of the circular bosses in the first hexagonal grid structure; and wherein the first gas channels are formed between the circular bosses within the first hexagonal grid structure.

18. The fuel cell as claimed in claim 17, wherein the bosses are circular and form a second regular hexagonal grid structure in the second region, said second regular hexagonal grid structure comprising a second boss center point at a geometric center point of the circular bosses in the second hexagonal grid structure; and wherein the second gas channels are formed between the circular bosses within the second hexagonal grid structure.

* * * * *